United States Patent
Hirose et al.

(10) Patent No.: US 10,802,476 B2
(45) Date of Patent: Oct. 13, 2020

(54) NUMERICAL CONTROLLER WITH LEARNED PRESSURE ESTIMATION

(71) Applicant: FANUC CORPORATION, Minamitsuru-gun, Yamanashi (JP)

(72) Inventors: Noboru Hirose, Yamanashi (JP); Keisuke Tsujikawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 95 days.

(21) Appl. No.: 15/960,123

(22) Filed: Apr. 23, 2018

(65) Prior Publication Data

US 2018/0314242 A1    Nov. 1, 2018

(30) Foreign Application Priority Data

Apr. 27, 2017  (JP) .................................. 2017-088408

(51) Int. Cl.
  *G05B 19/404*    (2006.01)
  *G05B 19/418*    (2006.01)

(52) U.S. Cl.
  CPC ............ *G05B 19/41885* (2013.01); *G05B 2219/32335* (2013.01); *G05B 2219/37399* (2013.01); *G05B 2219/42155* (2013.01)

(58) Field of Classification Search
  None
  See application file for complete search history.

(56) References Cited

U.S. PATENT DOCUMENTS

| 5,414,619 | A | * | 5/1995 | Katayama | ............... B21B 37/16 700/150 |
| 5,671,335 | A | * | 9/1997 | Davis | ..................... G06N 3/084 706/25 |
| 5,930,136 | A | * | 7/1999 | Nakajima | ............... B21B 37/28 700/33 |
| 2002/0019674 | A1 | * | 2/2002 | Liang | ..................... B29C 45/76 700/49 |
| 2008/0099943 | A1 | | 5/2008 | Yamagiwa et al. | |

(Continued)

FOREIGN PATENT DOCUMENTS

JP  H01215525 A  8/1989
JP  H06114908 A  4/1994

(Continued)

OTHER PUBLICATIONS

Notification of Reasons for Refusal for Japanese Application No. 2017-088408, dated Aug. 28, 2018, with translation, 10 pages.

(Continued)

*Primary Examiner* — Bernard G Lindsay
(74) *Attorney, Agent, or Firm* — RatnerPrestia

(57) ABSTRACT

Provided is a numerical controller capable of easily controlling a pressure without a pressure sensor. The numerical controller estimates a pressure based on at least one of a command value and a feedback value. A machine learning device for learning the pressure corresponding to the at least one of the command value and the feedback value is included. The machine learning device includes a state observation unit for observing the at least one of the command value and the feedback value as a state variable, a label data acquisition unit for acquiring label data indicating the pressure, and a learning unit for associating and learning the state variable with the label data.

12 Claims, 9 Drawing Sheets

(56) References Cited

U.S. PATENT DOCUMENTS

| | | | |
|---|---|---|---|
| 2008/0102147 A1* | 5/2008 | Shioiri | B29C 45/766 |
| | | | 425/148 |
| 2014/0228980 A1* | 8/2014 | Ohta | G05B 13/021 |
| | | | 700/29 |
| 2016/0257047 A1 | 9/2016 | Maruyama | |
| 2016/0375701 A1* | 12/2016 | Osterday | B41J 3/4075 |
| | | | 156/245 |
| 2017/0028593 A1 | 2/2017 | Maruyama | |
| 2017/0031330 A1 | 2/2017 | Shiraishi et al. | |
| 2017/0095960 A1* | 4/2017 | Chen | G05B 15/02 |

FOREIGN PATENT DOCUMENTS

| | | |
|---|---|---|
| JP | H07299849 A | 11/1995 |
| JP | 2006142659 A | 6/2006 |
| JP | 2008110485 A | 5/2008 |
| JP | 2008265052 A | 11/2008 |
| JP | 2013-182604 A | 9/2013 |
| JP | 2016159589 A | 9/2016 |
| JP | 2017030152 A | 2/2017 |
| JP | 2017030221 A | 2/2017 |

OTHER PUBLICATIONS

Notification of Reasons for Refusal for Japanese Application No. 2017-088408, dated Jan. 29, 2019, with translation, 9 pages.

* cited by examiner

NUMERICAL CONTROLLER WITH LEARNED PRESSURE ESTIMATION

CROSS-REFERENCE TO RELATED APPLICATION

This application is a new U.S. Patent Application that claims benefit of Japanese Patent Application No. 2017-088408, filed Apr. 27, 2017, the disclosure of this application is being incorporated herein by reference in its entirety for all purposes.

BACKGROUND OF THE INVENTION

1. Field of the Invention

The present invention relates to a numerical controller, and particularly relates to a numerical controller capable of controlling a pressure without a pressure sensor.

2. Description of the Related Art

Conventionally, in a machine, which operates a contact object using a servomotor, etc. and applies a force to an object to be touched, such as an injection molding machine, a press machine, etc., a pressure sensor is used to detect the force applied to the object to be touched (see FIG. 8). To use a pressure sensor, the pressure sensor incurs an expense, and a man-hour corresponding to work such as installing a strain gauge at a detection site is necessary.

In this respect, Japanese Patent Application Laid-Open No. 2013-182604 A discloses a device for predicting a pressure received by a driven portion (corresponding to the object to be touched) based on a current applied to a drive portion for operating an actuator (corresponding to the contact object), etc.

However, in the device described in Japanese Patent Application Laid-Open No. 2013-182604 A, for example, a complicated model for predicting the pressure received by the driven portion based on the current applied to the drive portion, etc. needs to be constructed in advance based on a two-inertial system control model. Construction of such a model is significantly complicated and difficult.

Furthermore, since it is not easy to apply the same model to machines having different configurations, it is necessary to construct a model for each machine type.

SUMMARY OF THE INVENTION

Embodiments have been conceived to solve such a problem, and an object of the embodiments is to provide a numerical controller capable of easily controlling a pressure without a pressure sensor.

A numerical controller according to embodiments is a numerical controller for estimating a pressure based on at least one of a command value and a feedback value related to a machine to be controlled, including a machine learning device for learning the pressure corresponding to the at least one of the command value and the feedback value, wherein the machine learning device includes a state observation unit for observing the at least one of the command value and the feedback value as a state variable, a label data acquisition unit for acquiring label data, indicating the pressure, and a learning unit for associating and learning the state variable with the label data.

In the numerical controller according to embodiments, the state observation unit observes at least one of identification data of a contact object and identification data of an object to be touched in addition to the at least one of the command value and the feedback value as the state variable.

In a numerical controller according to an embodiment, the learning unit includes an error calculator for calculating an error between a correlation model for determining the pressure from the state variable and a correlation characteristic identified from teacher data prepared in advance, and a model update unit for updating the correlation model to reduce the error.

In the numerical controller according to embodiments, the learning unit, calculates the state variable and the label data using a multi-layer structure.

The numerical controller according to embodiments further includes a determination output unit for outputting the pressure determined based on a learning result by the learning unit.

A numerical controller according to embodiments is a numerical controller for estimating a pressure based on at least one of a command value and a feedback value related to a machine to be controlled, including a model indicating a correlation between a state variable including the at least one of the command value and the feedback value and the pressure, and a determination output unit for outputting the pressure estimated based on the model.

In the numerical controller according to embodiments, the pressure output from the determination output unit is used as pressure feedback to control pressure.

In the numerical controller according to embodiments, the determination output unit outputs a warning when the pressure determined by the determination output unit meets a condition set in advance.

In the numerical controller according to embodiments, the state variable corresponds to a value obtained using at least one of a pressure command, a speed command, a current command, a current feedback value, a speed feedback value, identification data of a contact object, and identification data of an object to be touched.

In the numerical controller according to embodiments, a controller of the machine is caused to perform a predetermined operation determined in advance to estimate the pressure by the learning unit.

In the numerical controller according to embodiments, the predetermined operation determined in advance to perform the estimation is performed automatically or at a request of an operator.

In the numerical controller according to embodiments, the numerical controller is configured as a part of a controller of the machine.

In the numerical controller according to embodiments, the numerical controller is configured as a part of a management device for managing controllers of a plurality of machines via a network.

According to the embodiments, it is possible to provide a numerical controller capable of easily controlling a pressure without a pressure sensor.

BRIEF DESCRIPTION OF THE DRAWINGS

The above-described object, and characteristic of embodiments and other objects and characteristics will be clear from description of embodiments below with reference to accompanying drawings. In the drawings.

DETAILED DESCRIPTION OF THE PREFERRED EMBODIMENTS

Hereinafter, a configuration example of a numerical controller corresponding to embodiments will be described. However, a configuration of the numerical controller of the embodiments is not limited to the example below, and it is possible to employ any configuration when the configuration can realize an object of the embodiments.

Figure 8:
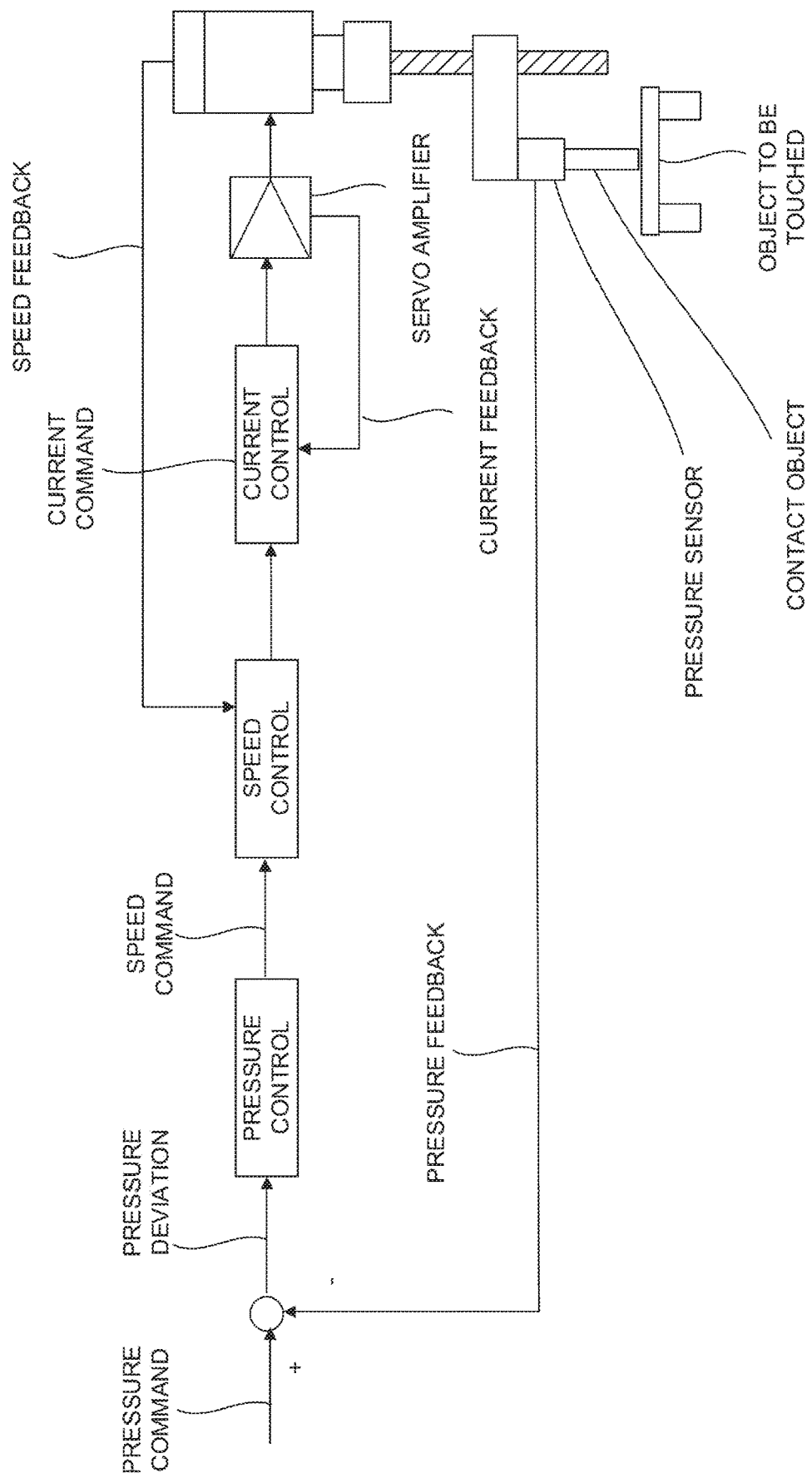
FIG. 8 is a diagram for description of a control method using a conventional pressure sensor.

FIG. 8 is a diagram illustrating an example of a machine control system using a pressure sensor. In this example, a control operation is performed such that a pressure is kept at an appropriate value based on feedback from the pressure sensor.

Figure 9:
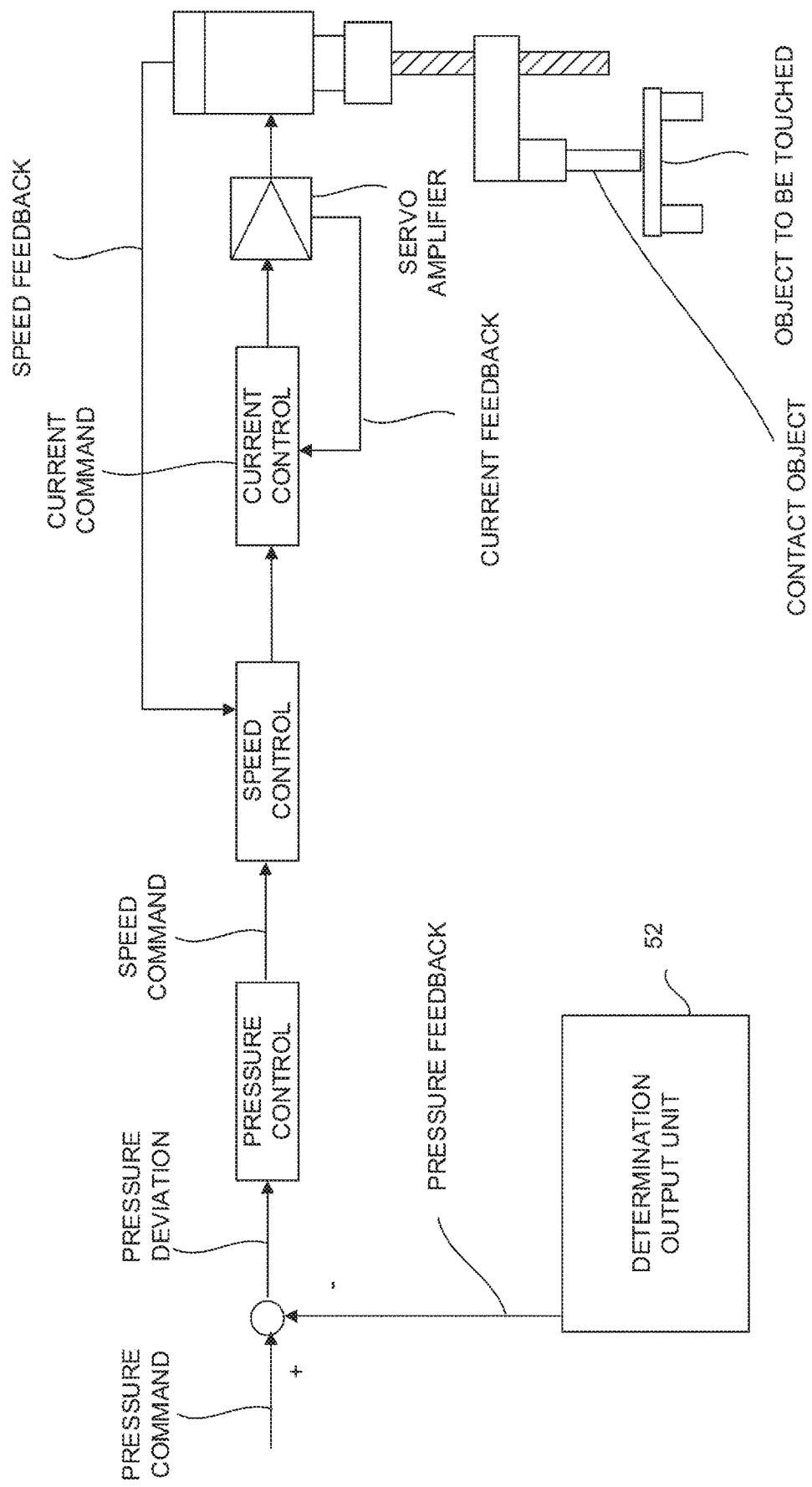
FIG. 9 is a diagram for description of a control method according to a numerical controller of the embodiments.

In the embodiments, while a numerical controller 10 is in a learning stage, a control operation using a pressure sensor is performed as in the past. However, in an estimation stage after learning is completed, pressure control without a pressure sensor becomes possible as illustrated in FIG. 9. That is, the numerical controller 10 in the estimation stage uses a pressure estimated by a model completing learning (output from a determination output unit 52) as pressure feedback to control pressure.

Figure 1:
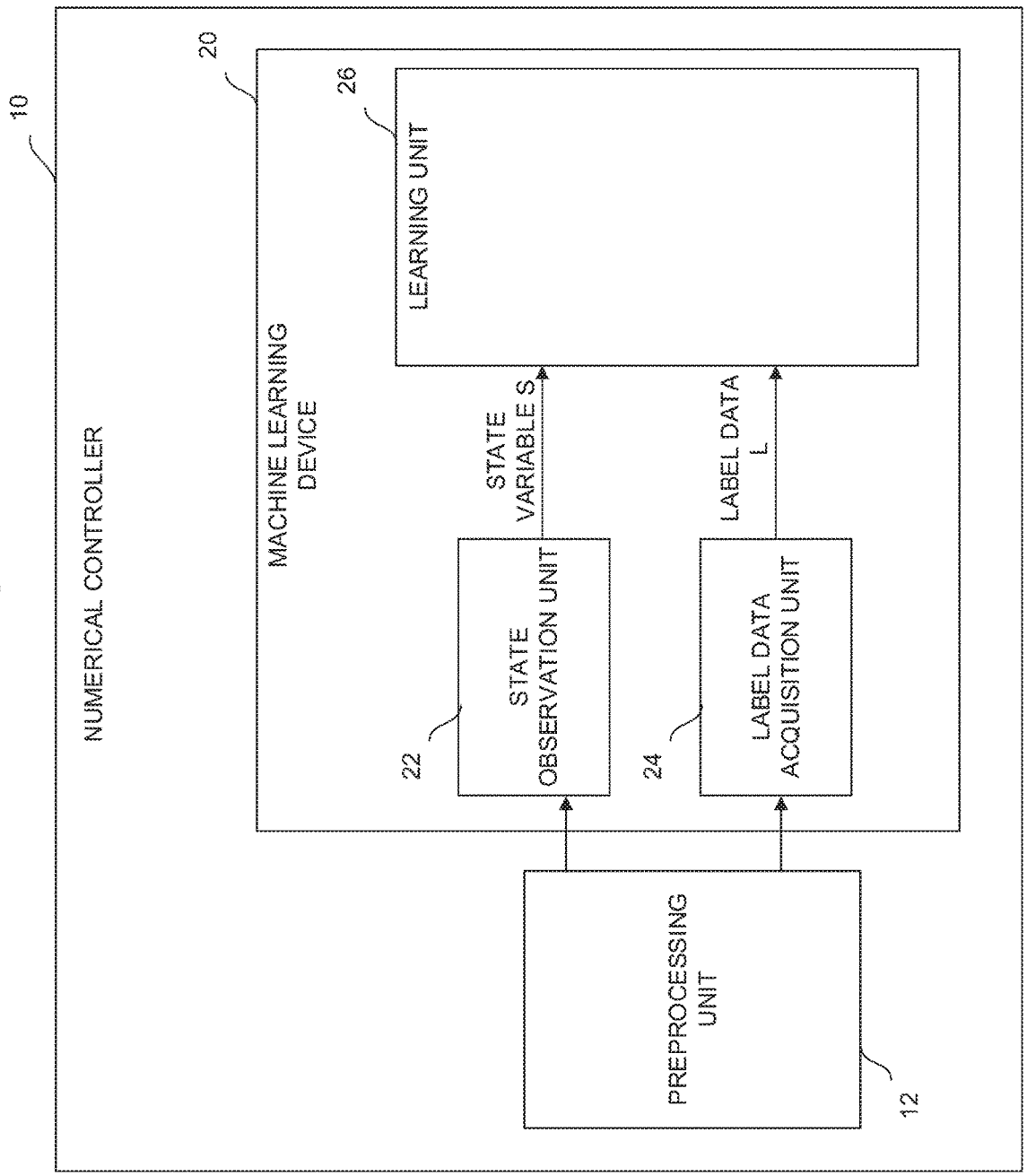
FIG. 1 is a schematic functional block diagram of a numerical controller according to a first embodiment.

FIG. 1 is a functional block diagram illustrating a schematic configuration of the numerical controller 10 corresponding to fin embodiment. For example, the numerical controller 10 is a device that controls a machine, which operates a contact object using a servomotor, etc. and applies a force to an object to be touched, such as an injection molding machine, a press machine, etc. In addition to a pressure command, a speed command, a current command, etc. for operating the machine, the numerical controller 10 can obtain input data such as current feedback, speed feedback, etc. from a constituent element of the machine such as a servo amplifier, a servomotor, etc. The numerical controller 10 includes a preprocessing unit 12 that performs preprocessing on the input data and a machine learning device 20 including software (a learning algorithm, etc.) and hardware (a central processing unit (CPU) of a computer, etc.) for self-leaning a relationship between the input data and the pressure through so-called machine learning. The relationship between the input data and the pressure learned by the machine learning device 20 included in the numerical controller 10 corresponds to a model structure representing a correlation between input data indicating an operation state of the machine (numerical data such as a command value, a feedback, value, etc.) and a pressure under the input data.

As illustrated by a functional block in FIG. 1, the machine learning device 20 included in the numerical controller 10 includes a state observation unit 22 that observes input data (numerical data such as a command value, a feedback value, etc.) indicating an operation state of the machine as a state variable S representing a current state of an environment, a label data acquisition unit 24 that acquires label data L indicating the pressure under the input data, and a learning unit 26 that associates and learns the state variable S with the label data L using the state variable S and the label data L.

For example, the preprocessing unit 12 may be configured as one function of the CPU of the computer. Alternatively, for example, the state observation unit 22 may be configured as software for causing the CPU of the computer to function. The preprocessing unit 12 performs preprocessing on data such as a command value held by the numerical controller 10, a feedback value returned to the numerical controller 10 from a constituent element of the machine controlled by the numerical controller 10, or data obtained by using or converting information identifying the contact object, the object to be touched, etc. and outputs the data after preprocessing to the state observation unit 22.

In addition, the preprocessing unit 12 acquires numerical data indicating the pressure under the input data as feedback from a pressure sensor (not illustrated), performs similar preprocessing, and outputs the preprocessed numerical data to the label data acquisition unit 24.

Examples of preprocessing per formed by the preprocessing unit 12 to acquire the state variable S include creation of a set of command values or feedback values (discrete values) for each constant time t in a period tracing back from a current time by a time T. That is, for example, the preprocessing unit 12 creates data listing current feedback values every 0.1 s during past one second from the present. In addition to the current feedback values, preprocessing may be similarly performed on input data such as a pressure command, a speed command, a current command, speed feedback, etc. Feedback from the pressure sensor will be separately described below.

In addition, the preprocessing unit 12 can generate identification data allowing identification of the contact object and the object to be touched. When code indicating the contact object and the object to be touched is defined in advance, for example, the preprocessing unit 12 can identify the contact object and the object to be touched by acquiring the code directly input from an interface such as a keyboard. The preprocessing unit 12 uses or converts the identified code to generate identification data.

In addition, the preprocessing unit 12 can create a set of command values or feedback values (discrete values) for each constant time t in a period tracing back from a current time by the time T with respect to a feedback value obtained from the pressure sensor. Alternatively, the preprocessing unit 12 can simply use or convert the feedback value from the pressure sensor at a current time point, that is, one discrete value.

For example, the state observation unit 22 may be configured as one function of the CPU of the computer. Alternatively, for example, the state observation unit 22 may be configured as software for causing the CPU of the computer to function. As numerical data corresponding to the state variable S observed by the state observation unit 22, for example, it is possible to use various command values or feedback values (excluding a feedback value of the pressure), data processed by the preprocessing unit 12 with respect to data obtained by using or converting the data, etc.

For example, the label data acquisition unit 24 may be configured as one function of the CPU of the computer. Alternatively, for example, the label data acquisition unit 24 may be configured as software for causing the CPU of the computer to function. As the label data L acquired by the label data acquisition unit 24, it is possible to use data, which indicates a feedback value from the pressure sensor, after the preprocessing unit 12 performs preprocessing. The label data L indicates a value of pressure under the state variable S.

In this way, while learning by the machine learning device 20 included in the numerical controller 10 is in progress, output of a command value from the numerical controller 10, various feedbacks in response to an operation of the machine based on the command value, and feedback from the pressure sensor are performed in the environment.

For example, the learning unit 26 may be configured as one function of the CPU of the computer. Alternatively, for example, the learning unit 26 may be configured as software for causing the CPU of the computer to function. The learning unit 26 learns a cause of occurrence of a machining surface defect according to an arbitrary learning algorithm collectively called machine learning. The learning unit 26 can iteratively execute learning based on various command values and feedback values, and a data set including the state variable S and the label data L related to the contact object and the object to the touched.

By repeating such a learning cycle, the learning unit 26 can automatically identify the various command values and feedback values, information related to the contact object and the object to the touched, and a characteristic indicating a correlation with the pressure. At the start, of the learning algorithm, the various command values and feedback values, the information related to the contact object and the object to the touched, and the correlation with the pressure are substantially unknown. However, as the learning progresses, the learning unit 26 gradually identifies the characteristic to interpret the correlation. When the various command values and feedback values, the information related to the contact object and the object to the touched, and the correlation with the pressure are interpreted to a level which is reliable to some extent, a learning result repeatedly output by the learning unit 26 can be used to perform selection of behavior (that is, decision-making) with regard to a pressure value to be correspond to various current command values and feedback values and information related to the contact object and the object to be touched. That is, as the learning algorithm is progressed, the learning unit 26 can gradually approximate a correlation with the various command values and feedback values, the information related to the contact object and the object to the touched, and behavior such as a pressure value to be obtained to an optimum solution.

As described above, in the machine learning device 20 included in the numerical controller 10, the learning unit 26 learns a pressure corresponding to the various command values and feedback values and the information related to the contact object and the object to the touched according to a machine learning algorithm using the state variable S observed by the state observation unit 22 and the label data L acquired by the label data acquisition unit 24. The state variable S includes data rarely influenced by disturbance such as the various command values and feedback values, the contact object, and the object to be touched, and the label data L is uniquely obtained based on feedback from the pressure sensor. Therefore, according to the machine learning device 20 included in the numerical controller 10, estimation of a pressure value based on the various command values and feedback values, the contact object, and the object to be touched may be automatically and accurately performed without depending on calculation or expectation using a learning result of the learning unit 26.

When determination of a pressure can be automatically performed without depending on calculation or expectation, the pressure can be automatically estimated thereafter without the pressure sensor by identifying the various command values and feedback values, the contact object, and the object to be touched. Therefore, it is possible to suppress cost and time for using the pressure sensor after the learning stage. In addition, when a result of learning by the numerical controller 10 in a certain machine is used to estimate a pressure in another similar machine, cost and time for introducing the pressure sensor is unnecessary in the other similar machine.

As a modification of the machine learning device 20 included in the numerical controller 10, the learning unit 26 can use the state variable S and the label data L obtained for each of a plurality of machines to learn a relationship between various command values and feedback values, a contact object, and an object to be touched and a pressure of each of the machines. According to this configuration, it is possible to increase the number of data sets including the state variable S and the label data L obtained in a fixed time, and thus it is possible to improve speed and reliability of learning of the relationship between the various command values and feedback values, the contact object, and the object to be touched and the pressure using more various data sets as an input.

Figure 2:
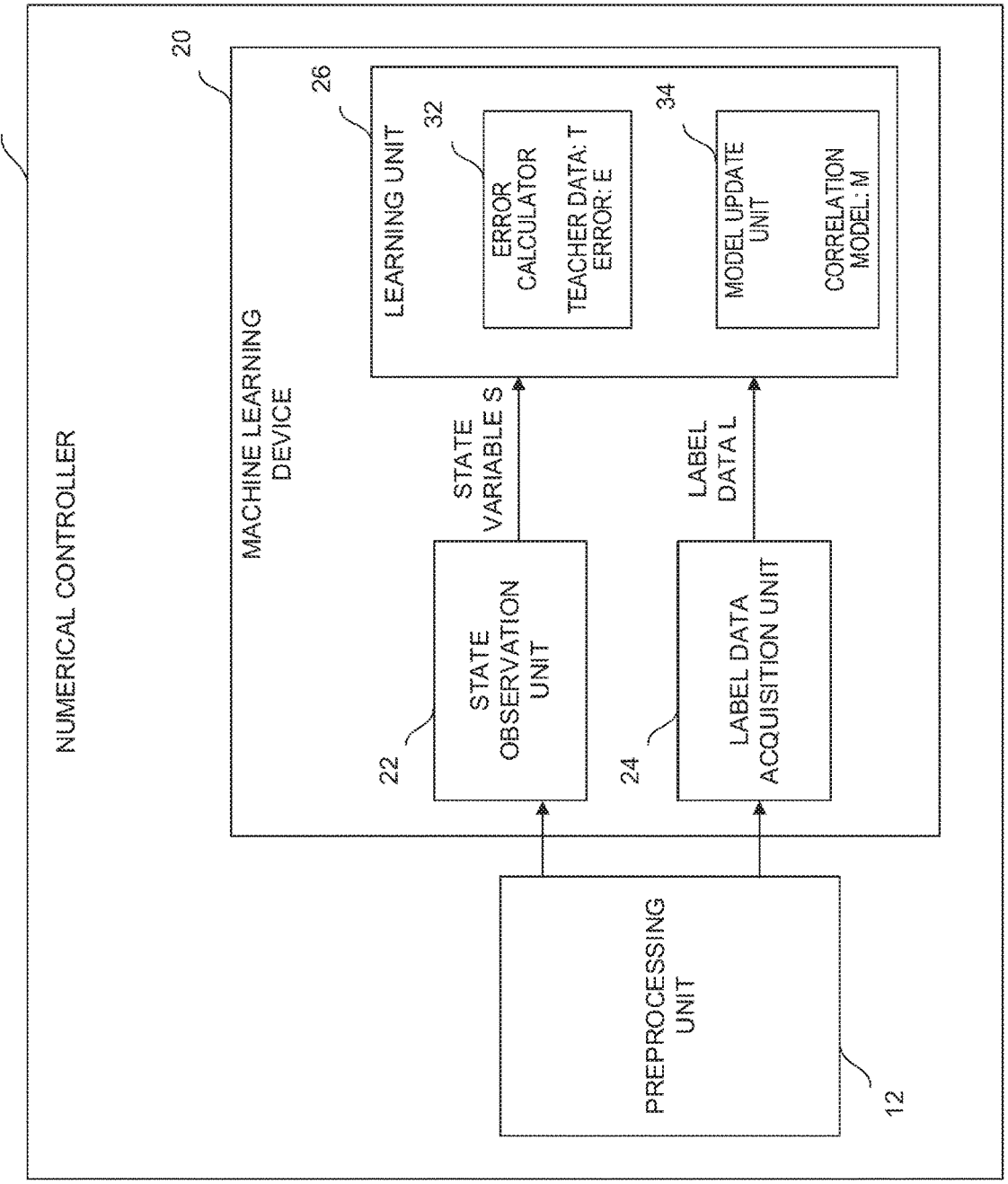
FIG. 2 is a schematic functional block diagram illustrating a mode of the numerical controller.

In the machine learning device 20 having the above-described configuration, a learning algorithm executed by the learning unit 26 is not particularly restricted, and it is possible to employ a known, learning algorithm as machine learning. FIG. 2 corresponds to a mode of the numerical controller 10 illustrated in FIG. 1 and illustrates a configuration including the learning unit 26 that performs supervised learning as an example of the learning algorithm. The supervised learning corresponds to a scheme in which a large number of known data sets (referred to as teacher data) of an input and an output corresponding thereto are given in advance, and a characteristic implying a correlation between the input and output is identified from the teacher data, thereby learning a correlation model for estimating a required output with respect to a new input (a pressure corresponding to various command values and feedback values, a contact object, and an object to be touched in the machine learning device 20 of this application).

In the machine learning device 20 included in the numerical controller 10 illustrated in FIG. 2, the learning unit 26 includes an error calculator 32 that calculates an error E between a correlation model M deriving a pressure from the state variable S and a correlation characteristic identified from teacher data T prepared in advance, and a model update unit 34 that updates a correlation model M to reduce the error E. In the learning unit 26, the model update unit 34 learns a pressure corresponding to various command values and feedback values, a contact object, and an object to be touched by repeating update of the correlation model M.

The correlation model M may be constructed by regression analysis, reinforcement learning, depth learning, etc. For example, an initial value of the correlation model M is given to the learning unit 26 before starting the supervised learning as representing a correlation between the state variable S and the cause of occurrence of the machining surface defect in a simplified manner. For example, the teacher data T may include an empirical value accumulated by recording various command values and feedback values obtained in past work and pressures corresponding to a contact object and an object to be touched (a known data set of various command values and feedback values, a contact object, an object to be touched, and a pressure), and is given to the learning unit 26 before starting the supervised learning. The error calculator 32 identifies a correlation characteristic implying a correlation between the various command values and feedback values, the contact object, and the object to be touched and the pressure from a large amount of teacher data T given to the learning unit 26, and obtains an error E between the correlation characteristic and a correlation model M corresponding to a state variable S in a current state. For example, the model update unit 34 updates the correlation model M in a direction in which the error E decreases according to a predetermined update rule.

In a subsequent learning cycle, according to a correlation model M after update, the error calculator 32 uses a state variable S indicating various command values and feedback values, a contact object, and an object to be touched and label data L corresponding to a pressure obtained at this time to obtain an error E with respect to the correlation model M corresponding to the state variable S and the label data L. Further, the model update unit 34 updates the correlation model M again. In this way, a correlation between the current state (the various command values and feedback values, the contact object, and the object to be touched) of the environment which has not been known and determination of a state (pressure) corresponding thereto gradually becomes clear. That is, due to update of the correlation model M, the relationship between the various command values and feedback values, the contact object, and the object to be touched and the pressure gradually approaches an optimum solution.

Figure 3A:
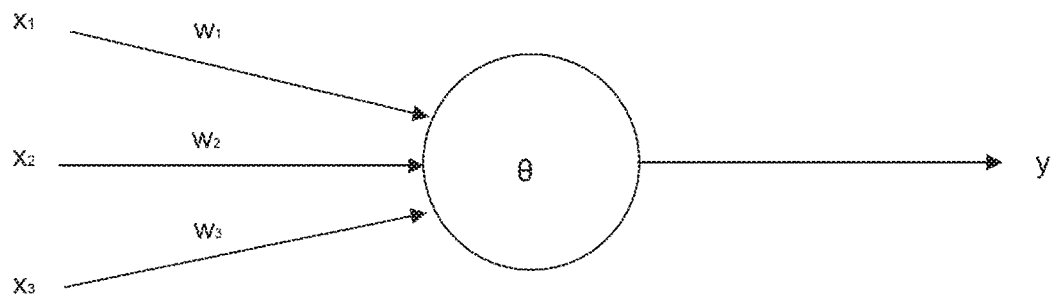
FIG. 3A is a diagram for description of a neuron.
Figure 3B:
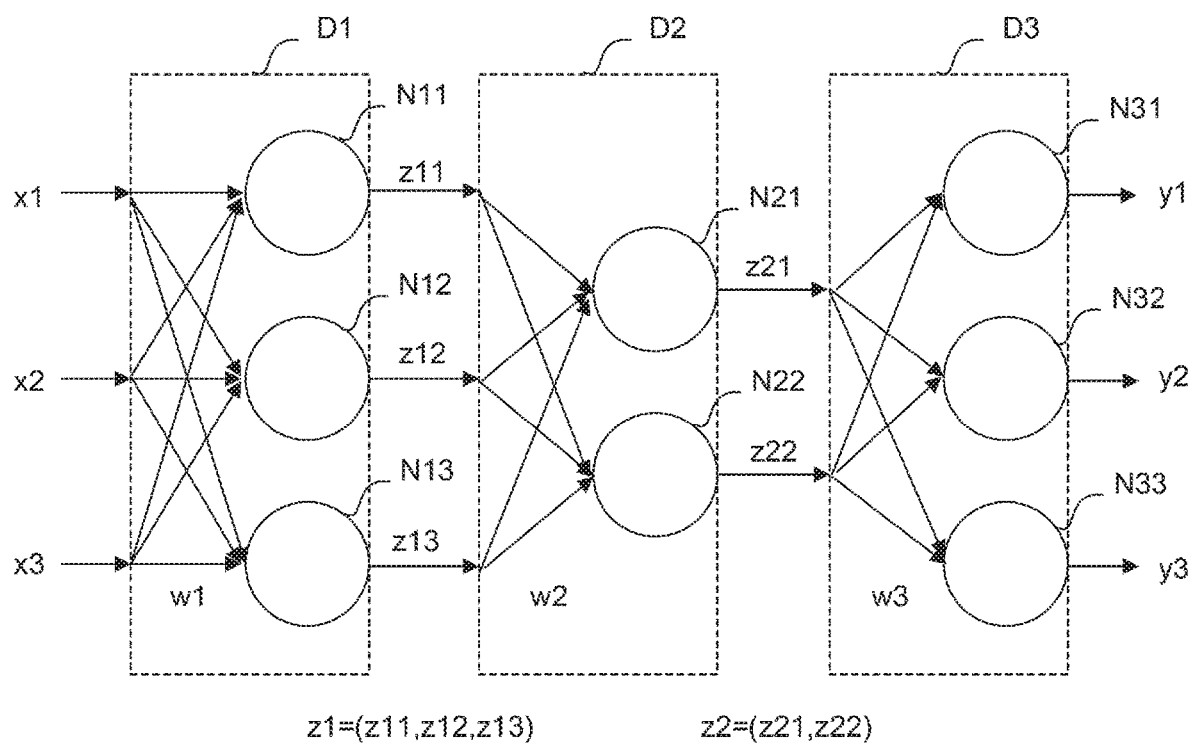
FIG. 3B is a diagram for description of a neural network.

When the above-described supervised learning is in progress, for example, it is possible to use a neural network. FIG. 3A schematically illustrates a model of a neuron. FIG. 3B schematically illustrates a model of a three-layer neural network constructed by combining neurons illustrated in FIG. 3A. For example, the neural network can be constituted by an arithmetic unit, a storage unit, etc. imitating a model of a neuron.

The neuron illustrated in FIG. 3A outputs a result y with respect, to a plurality of inputs x (here, as an example, an input $x_1$ to an input $x_3$). Each of the inputs $x_1$ to $x_3$ is multiplied by a weight w ($w_1$ to $w_3$) corresponding to the input x. In this way, the neuron outputs the output y expressed by Equation 1 below. In Equation 1, all the input x, the output y, and the weight w correspond to vectors. In addition, θ denotes a bias, and $f_k$ denotes an activation function.

$$y = f_k(\Sigma_{i=1}^{n} x_i w_i - \theta)$$ [Equation 1]

In the three-layer neural network illustrated in FIG. 3B, a plurality of inputs x (here, as an example, an input x1 to an input x3) is input from a left side, and results y (here, as an example, a result y1 to a result y3) are output from a right side. In the illustrated example, each of the inputs x1, x2, and x3 is multiplied by a corresponding weight (collectively represented by w1), and the individual inputs x1, x2, and x3 are input to three neurons N11, N12, and N13.

In FIG. 3B, outputs of the respective neurons N11 to N13 are collectively represented by z1. z1 may be regarded as a feature vector from which a feature quantity of the input vector is extracted. In the illustrated example, each of the feature vectors z1 is multiplied by a corresponding weight (collectively represented by w2), and the respective feature vectors z1 are input to two neurons N21 and N22. The feature vector z1 represents a feature between the weight w1 and the weight w2.

In FIG. 3B, outputs of the respective neurons N21 and N22 are collectively represented by z2. z2 may be regarded as a feature vector from which a feature quantity of the feature vector z1 is extracted. In the illustrated example, each of the feature vectors z2 is multiplied by a corresponding weight (collectively represented by w3), and the respective feature vectors z2 are input to three neurons N31, N32, and N33. The feature vector z2 represents a feature between the weight w2 and the weight w3. Finally, the neurons N31 to N33 output results y1 to y3, respectively.

In the machine learning device 20 included in the numerical controller 10, the learning unit 26 can output, a pressure (result y) by performing a multi-structure calculation according to the above-described neural network using a state variable S as an input x. Examples of an operation mode of the neural network include a learning mode and a determination mode. For example, a weight w may be learned using a learning data set in the learning mode, and a pressure may be estimated in the determination mode using the learned weight w. In the determination mode, it is possible to perform detection, classification, inference, etc.

The above-described configuration of the numerical controller 10 may be described as a machine learning method (or software) executed by the CPU of the computer. This machine learning method is a machine learning method of learning a pressure corresponding to the various command values and feedback values, the contact object, and the object to the touched. Further, the CPU of the computer has a step of observing various command values and feedback values, a contact object, and an object to the touched as a state variable S, a step of acquiring label data L indicating a pressure, and a step of associating and learning the various command values and feedback values, the contact object, and the object, to the touched with the pressure using the state variable S and the label data L.

Figure 4:
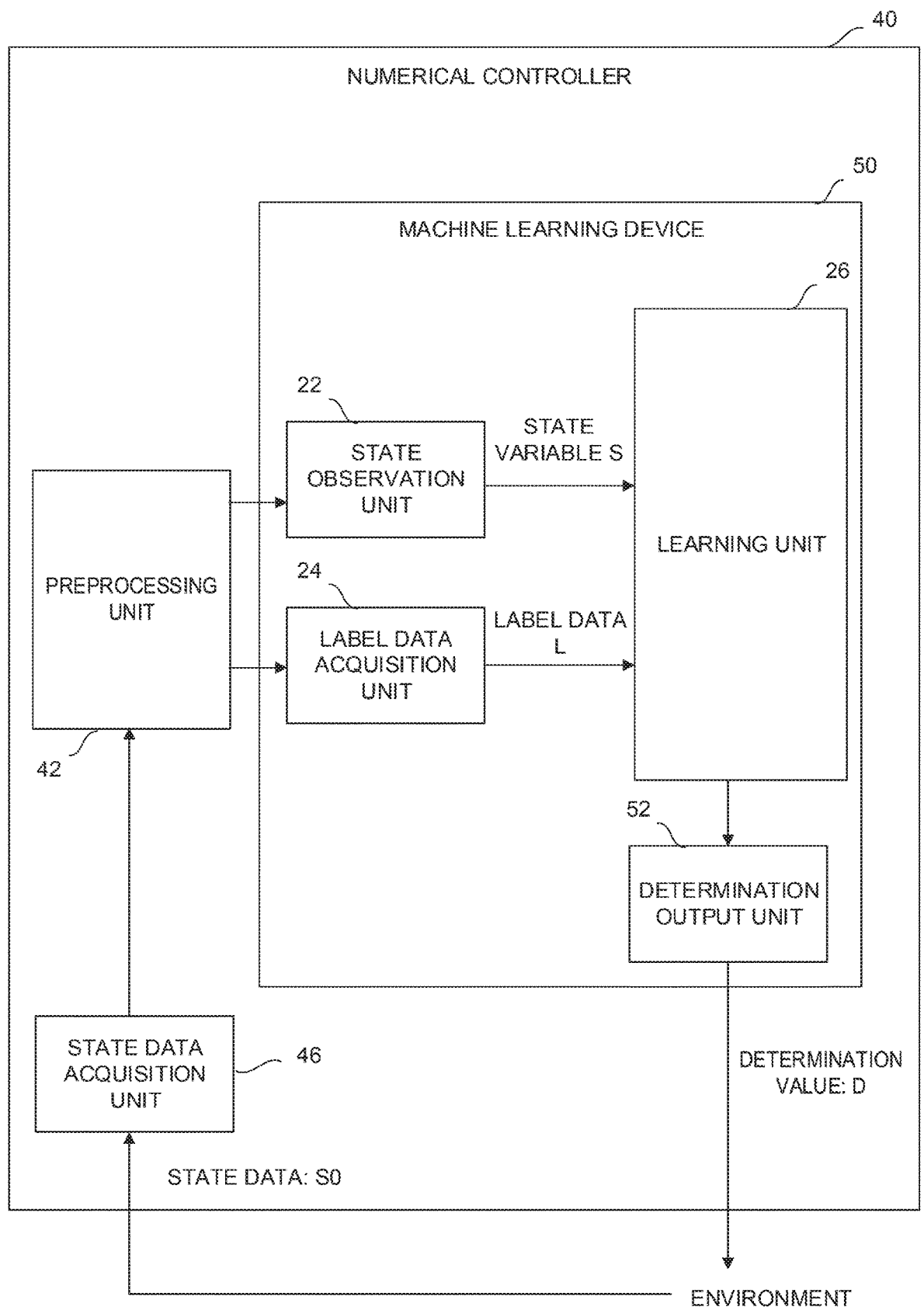
FIG. 4 is a schematic functional block diagram of a numerical controller according to a second embodiment.

FIG. 4 illustrates a numerical controller 40 according to a second embodiment. The numerical controller 40 includes a preprocessing unit 42, a machine learning device 50, and a state data acquisition unit 46 that acquires data input to the preprocessing unit 42 as state data S0. The state data acquisition unit 46 can acquire the state data S0 from a sensor attached to the numerical controller 40 or a machine, an appropriate data input by an operator, etc.

In addition to software (a learning algorithm, etc.) and hardware (a CPU of a computer, etc.) for self-leaning a pressure corresponding to various command values and feedback values, a contact object, and an object to be touched through machine learning, the machine learning device 50 included in the numerical controller 40 includes software (an arithmetic algorithm, etc.) and hardware (a CPU of a computer, etc.) for displaying a pressure estimated by a learning unit 26 based on various command values and feedback values, a contact object, and an object to be touched as characters on a display device (not illustrated), outputting the pressure as sound or voice to a speaker (not illustrated), outputting the pressure by an alarm lamp (not illustrated), or outputting the pressure as a combination thereof. The machine learning device 50 included in the numerical controller 40 may have a configuration in which one common CPU executes all software such as a learning algorithm, an arithmetic algorithm, etc.

For example, a determination output unit 52 may be configured as one function of the CPU of the computer. Alternatively, for example, the determination output unit 52 may be configured as software for causing the CPU of the computer to function. The determination output unit 52 outputs a command such that the pressure estimated by the learning unit 26 based on the various command values and feedback values, the contact object, and the object to be touched is reported to the operator as display of characters, output by sound or voice, output by an alarm lamp, or a combination thereof. The determination output unit 52 can output a notification command to a display device, etc. included in the numerical controller 40 or output a notification command to a display device, etc. included in the machine.

The machine learning device 50 included in the numerical controller 40 having the above-described configuration has the same effect as that of the machine learning device 20 described above. In particular, the machine learning device 50 can change a state of an environment, by an output, of the determination output unit 52. Meanwhile, in the machine learning device 20, an external device (for example, a controller of the machine) may be requested to have a function corresponding to the determination output unit for reflecting a learning result of the learning unit 26 in the environment.

As a modification of the numerical controller 40, the determination output unit 52 can provide a predetermined threshold value for the pressure estimated by the learning unit 26 based on the various command values and feedback values, the contact object, and the object to be touched, and output information as a warning when a cause of occurrence of a machining surface defect determined by the learning unit 26 based on an inspection result by an inspection device exceeds the threshold value.

Figure 5:
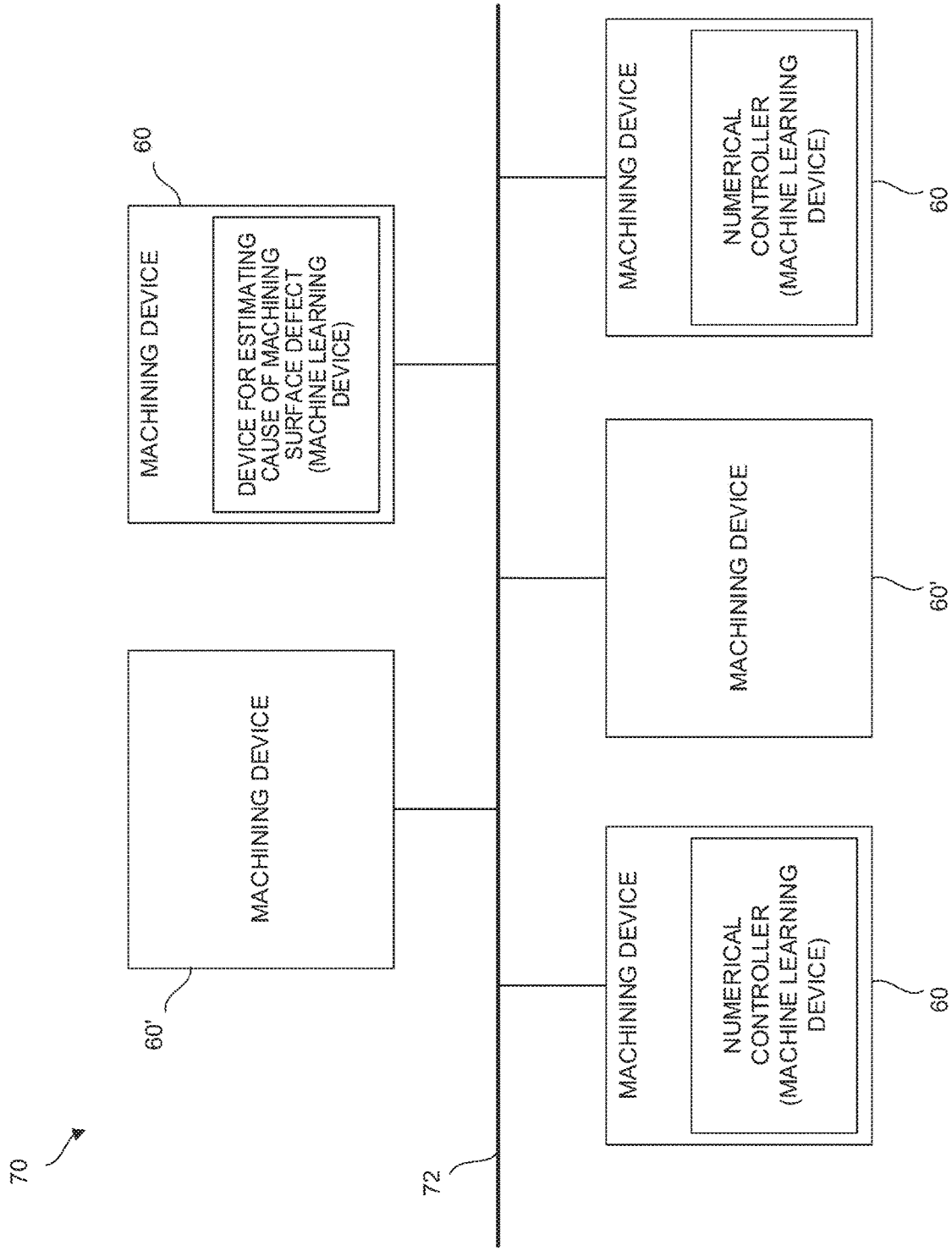
FIG. 5 is a schematic functional block diagram illustrating a mode of a control system.

FIG. 5 illustrates a machining system 70 according to an embodiment including a plurality of machining devices 60. The machining system 70 includes a plurality of machining devices 60 and 60' having the same configuration and a network 72 that connects the machining devices 60 and 60' to each other, and at least, one of the plurality of machining devices 60 and 60' is configured as a machining device 60 including the above-described numerical controller 40. In addition, the machining system 70 may include a machining device 60' not including the numerical controller 40. The machining devices 60 and 60' have a general configuration required for machine control.

In the machining system 70 having the above-described configuration, the machining device 60 including the numerical controller 40 among the plurality of machining devices 60 and 60' can automatically and accurately obtain a pressure corresponding to various command values and feedback values, a contact object, and an object to be touched in the machining device 60 without depending on calculation or expectation using a learning result of the learning unit 26. In addition, a numerical controller 40 of at least one of the machining devices 60 can learn a pressure corresponding to various command values and feedback values, a contact object, and an object, to be touched in machining devices 60 and 60' common to all the machining devices 60 and 60' based on a state variable S and a label data L obtained for each of the other plurality of machining devices 60 and 60', and a learning result thereof may be shared by all the machining devices 60 and 60'. Therefore, according to the machining system 70, it is possible to improve speed or reliability of learning of the pressure corresponding to the various command values and feedback values, the contact object, and the object to be touched using more various data, sets (including the state variable S and the label data L) as an input.

Figure 6:
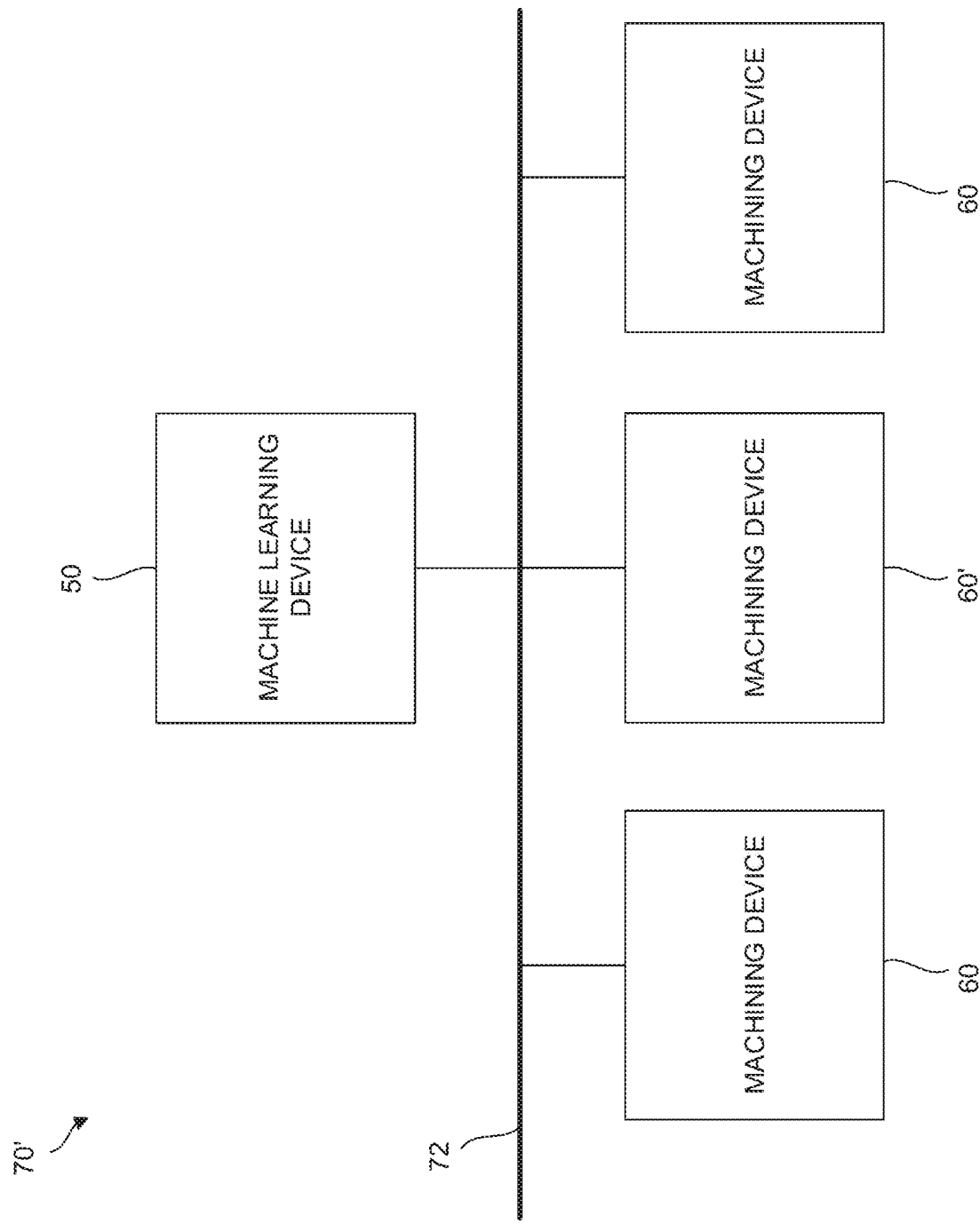
FIG. 6 is a schematic functional block diagram illustrating another mode of the control system.

FIG. 6 illustrates a machining system 70' according to another embodiment included in a machining device 60'. The machining system 70" includes a machine learning device 50 (or 20), a plurality of machining devices 60' for machining a product, and a network 72 that connects the machining devices 60' and the machine learning device 50 (or 20) to each other.

In the machining system 70' having the above-described configuration, the machine learning device 50 (or 20) can learn a pressure corresponding to various command values and feedback values, a contact object, and an object to be touched common to all the machining devices 60' based on a state variable S and a label data L obtained for each of the plurality of machining devices 60', and automatically and accurately obtain the pressure corresponding to the various command values and feedback values, the contact object, and the object to be touched without depending on calculation or expectation using a learning result thereof.

The machining system 70' may have a configuration in which the machine learning device 50 (or 20) is present, in a cloud server prepared in the network 72. According to this configuration, it is possible to connect the necessary number of machining devices 60' to the machine learning device 50 (or 20) whenever necessary regardless of a place or time at which each of the plurality of machining devices 60' is present.

An operator engaged with the machining systems 70 and 70' can determine whether an achievement level of learning of the pressure corresponding to the various command values and feedback values, the contact object, and the object to be touched by the machine learning device 50 (or 20) reaches a requested level at an appropriate time after the start of learning by the machine learning device 50 (or 20).

Figure 7:
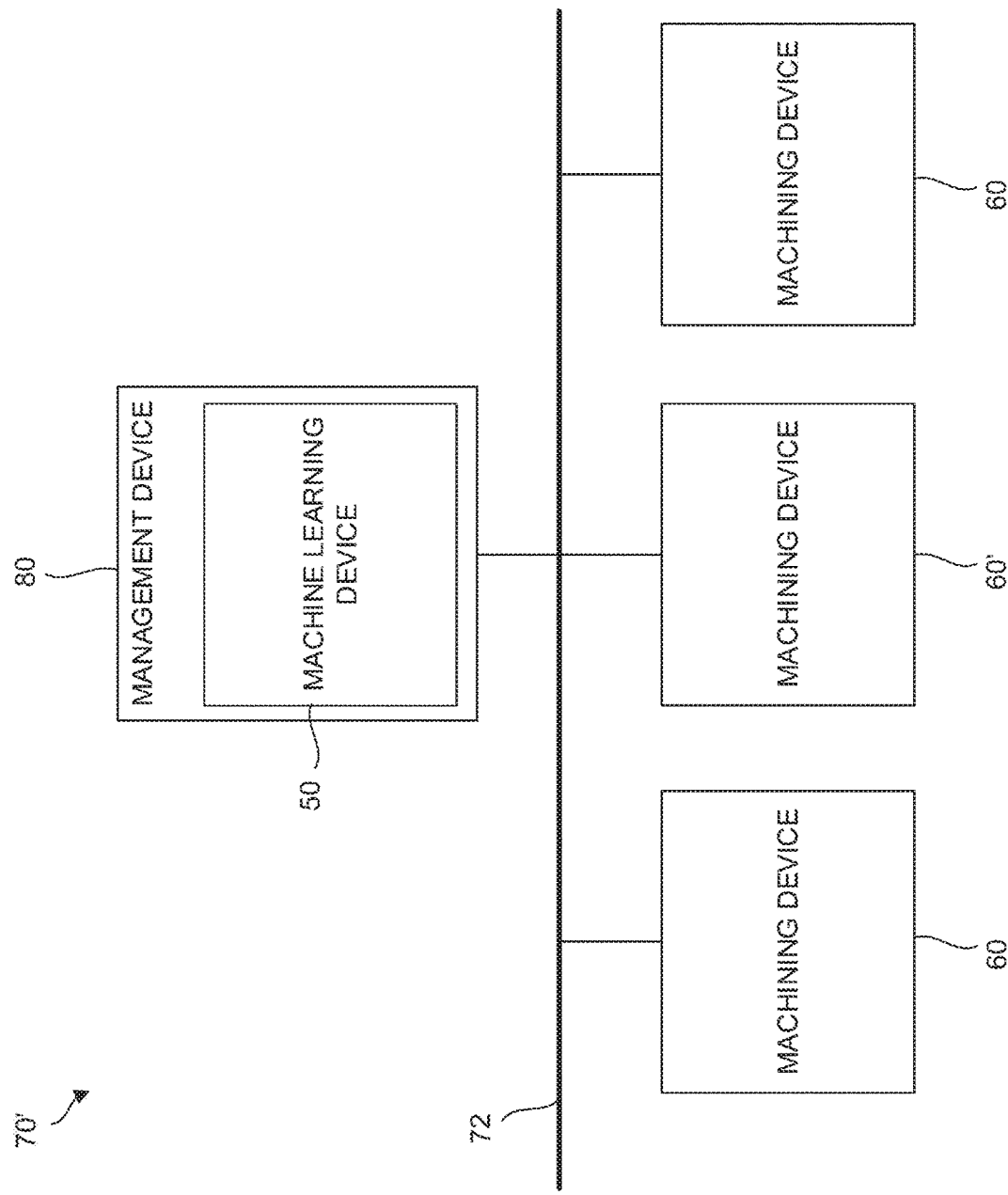
FIG. 7 is a schematic functional block, diagram illustrating a mode of a control system including a management device.

As a modification of the machining systems 70 and 70', it is possible to mount the numerical controller 40 in a form incorporated in a management device 30 that manages the machining devices 60 and 60'. As illustrated in FIG. 7, a plurality of machining devices 60 and 60' is connected to the management device 80 via a network 72, and the management device 80 collects data related to various command values and feedback values, a contact object, and an object to be touched in each of the machining devices 60 and 60' via the network 72. The management device 80 can receive information from arbitrary machining devices 60 and 60', command the machine learning device 50 to determine a pressure in the machining devices 60 and 60', output a result thereof to a display device, etc. included in the management device 80, and output the result to machining devices 60 and 60' to be determined. According to this configuration, it is possible to centrally manage a determination result of the machining devices 60 and 60', etc. using the management device 80, and to collect a state variable corresponding to a sample from the plurality of machining devices 60 and 60' at the time of relearning. Thus, there is an advantage that it is easy to collect a lot of data for relearning.

Even though the embodiments have been described above, the embodiments are not limited to the above-described examples of the embodiments, and may be implemented in various modes by making appropriate changes.

For example, a learning algorithm executed by the machine learning devices 20 and 50, an arithmetic algorithm executed by the machine learning device 50, a control algorithm executed by the numerical controllers 10 and 40, etc. are not limited to those described above, and various algorithms can be adopted.

For example, in the above embodiments, the information indicating the various command values and feedback values, the contact object, and the object to be touched has been used as the state variable S. However, all these values may not be used as the state variable S. For example, it is possible to combine arbitrary one or more values among these values, and learn and estimate a correlation between these values and the pressure.

Even though the embodiments have been described above, the embodiments are not limited to the above-described examples of the embodiments, and may be implemented in various modes by making appropriate changes.

The invention claimed is:

1. A numerical controller for controlling a machine operating a contact object using a motor to apply a force to an object to be touched and for estimating a pressure to apply to the object to be touched based on at least one of a command value and a feedback value associated with an operation of the contact object, the numerical controller comprising:
a machine learning device for learning the pressure corresponding to the at least one of the command value and the feedback value,
wherein the machine learning device includes:
a state observation unit for observing as a state variable the at least one of the command value and the feedback value and at least one of data for identifying the contact object and data for identifying the object to be touched,
a label data acquisition unit for acquiring label data indicating the pressure under the state variable, and
a learning unit for associating the learned pressure with a corresponding state variable and label data to determine a pressure of the machine applying the force to the object to be touched without a pressure sensor, and learning a cause of an occurrence of a machining surface defect,
wherein the learning unit utilizes teacher data prepared in advance including sensed pressures applied by the machine corresponding to a plurality of state variables, and
wherein the learning unit outputs a learned pressure corresponding to an input state variable to control the machine.

2. The numerical controller according to claim 1, wherein the learning unit includes:
an error calculator for calculating an error between a correlation model for determining the pressure from the state variable and a correlation characteristic identified from the teacher data, and
a model update unit for updating the correlation model to reduce the error.

3. The numerical controller according to claim 1, wherein the learning unit calculates the state variable and the label data using a multi-layer structure.

4. The numerical controller according to claim 1, further comprising
a determination output unit for outputting the pressure determined based on a learning result by the learning unit.

5. The numerical controller according to claim 1, wherein the command value included in the state variable is that obtained by using at least one of a pressure command, a speed command, and a current command, and the feedback value is that obtained by using at least one of the current feedback value and the speed feedback value.

6. The numerical controller according to claim 1, wherein a controller of the machine is caused to perform a predetermined operation determined in advance to estimate the pressure by the learning unit.

7. The numerical controller according to claim 6, wherein the predetermined operation determined in advance to perform the estimated pressure is performed automatically or at a request of an operator.

8. The numerical controller according to claim 1, wherein the numerical controller is configured as a part of a controller of the machine.

9. The numerical controller according to claim 1, wherein the numerical controller is configured as a part of a management device for managing controllers of a plurality of machines via a network.

10. A numerical controller for controlling a machine operating a contact object using a motor to apply a force to an object to be touched and for estimating a pressure to apply to the object to be touched based on at least one of a command value and a feedback value associated with an operation of the contact object, the numerical controller comprising:
a machine learning device for learning the pressure corresponding to the at least one of the command value and the feedback value,
wherein the machine learning device includes:
a state observation unit for observing as a state variable the at least one of the command value and the feedback value and at least one of data for identifying the contact object and data for identifying the object to be touched,
a label data acquisition unit for acquiring label data indicating the pressure under the state variable, and
a learning unit for associating the learned pressure with a corresponding state variable and label data to determine a pressure of the machine applying the force to the object to be touched without a pressure sensor, and learning a cause of an occurrence of a machining surface defect,
wherein a learning result by the learning unit is a model indicating a correlation between the state variable and the pressure estimated, the state variable including the at least one of the command value and the feedback value; and
a determination output unit for outputting the pressure estimated based on the model, wherein the pressure output from the determination output unit is used as pressure feedback to control pressure of the machine applying the force to the object to be touched,
wherein the learning unit utilizes teacher data prepared in advance including sensed pressures applied by the machine corresponding to a plurality of state variables.

11. The numerical controller according to claim 10, wherein the pressure output from the determination output unit is used as pressure feedback to control pressure.

12. The numerical controller according to claim 10, wherein the determination output unit outputs a warning when the pressure determined by the determination output unit meets a condition set in advance.

* * * * *